US008667603B2

(12) United States Patent
Brown et al.

(10) Patent No.: US 8,667,603 B2
(45) Date of Patent: Mar. 4, 2014

(54) SYSTEM AND METHOD FOR SEARCHING SECURE ELECTRONIC MESSAGES

(75) Inventors: Michael S. Brown, Waterloo (CA); Neil P. Adams, Waterloo (CA); Michael K. Brown, Peterborough (CA); Michael G. Kirkup, Waterloo (CA); Herbert A. Little, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1478 days.

(21) Appl. No.: 11/118,792

(22) Filed: Apr. 29, 2005

(65) Prior Publication Data

US 2005/0250478 A1 Nov. 10, 2005

Related U.S. Application Data

(60) Provisional application No. 60/567,134, filed on Apr. 30, 2004.

(51) Int. Cl.
*G06F 7/04* (2006.01)

(52) U.S. Cl.
USPC .......... 726/27; 726/29; 726/30; 726/17; 713/176; 713/193; 380/277; 380/278; 707/706; 455/412.1; 455/411

(58) Field of Classification Search
USPC ........ 713/193, 176, 189, 190, 170, 171, 180; 380/270, 247–250; 726/16–21, 27–30; 707/8, 706–712; 709/217, 219; 455/410, 411, 414.1, 412.1, 412.2, 455/466, 404.1; 379/207.15
See application file for complete search history.

(56) References Cited

U.S. PATENT DOCUMENTS

| | | | | |
|---|---|---|---|---|
| 5,719,941 A * | 2/1998 | Swift et al. | ................... | 713/155 |
| 6,192,362 B1 | 2/2001 | Schneck et al. | | |
| 6,356,893 B1 | 3/2002 | Itakura et al. | | |
| 6,587,549 B1 * | 7/2003 | Weik | .......................... | 379/93.24 |
| 6,757,530 B2 * | 6/2004 | Rouse et al. | ............... | 455/412.1 |
| 6,920,332 B2 * | 7/2005 | Ala-Luukko | ................. | 455/466 |
| 7,124,301 B1 * | 10/2006 | Uchida | ......................... | 713/189 |
| 7,191,466 B1 * | 3/2007 | Hamid et al. | ..................... | 726/3 |
| 7,295,836 B2 * | 11/2007 | Yach et al. | .................... | 455/415 |
| 7,490,130 B2 * | 2/2009 | Hosono | ......................... | 709/206 |
| 7,523,112 B2 * | 4/2009 | Hassan et al. | ......................... | 1/1 |
| 2002/0007453 A1 | 1/2002 | Nemovicher | | |

(Continued)

FOREIGN PATENT DOCUMENTS

| | | |
|---|---|---|
| EP | 1119132 A2 | 7/2001 |
| WO | WO 98/59456 | 12/1998 |
| WO | 01/75559 A2 | 10/2001 |
| WO | 02/102009 A | 12/2002 |

OTHER PUBLICATIONS

Perrig, Adrian et al: "Practical techniques for searches on encrypted data", 2000 IEEE Symposium, May 14-17, 2000, pp. 44-55, Berkeley, CA—13 pgs.

(Continued)

*Primary Examiner* — Allahyar Kasraian
(74) *Attorney, Agent, or Firm* — Fish & Richardson P.C.

(57) ABSTRACT

Systems and methods for searching secure electronic messages. An input search is received for use in searching content of electronic messages. The search includes searching content of secure electronic messages. The results of the search are provided.

36 Claims, 11 Drawing Sheets

(56) References Cited

U.S. PATENT DOCUMENTS

| | | | |
|---|---|---|---|
| 2002/0023213 A1* | 2/2002 | Walker et al. | 713/168 |
| 2002/0184317 A1* | 12/2002 | Thankachan | 709/206 |
| 2003/0081001 A1 | 5/2003 | Munro | |
| 2003/0157968 A1* | 8/2003 | Boman et al. | 455/563 |
| 2004/0078596 A1 | 4/2004 | Kent, Jr. et al. | |
| 2004/0083393 A1* | 4/2004 | Jordan et al. | 713/202 |
| 2004/0087300 A1* | 5/2004 | Lewis | 455/412.2 |
| 2004/0133775 A1* | 7/2004 | Callas et al. | 713/153 |
| 2004/0203619 A1* | 10/2004 | Tissot | 455/412.1 |
| 2004/0205248 A1* | 10/2004 | Little et al. | 709/246 |
| 2005/0108435 A1* | 5/2005 | Nowacki et al. | 709/246 |
| 2005/0113066 A1* | 5/2005 | Hamberg | 455/411 |
| 2005/0119019 A1* | 6/2005 | Jang | 455/466 |
| 2005/0138353 A1* | 6/2005 | Spies et al. | 713/153 |
| 2006/0019634 A1* | 1/2006 | Hawkes | 455/411 |
| 2006/0031364 A1* | 2/2006 | Hamilton et al. | 709/206 |
| 2006/0105750 A1* | 5/2006 | Zabawskyj et al. | 455/412.1 |
| 2006/0141989 A1* | 6/2006 | Guo et al. | 455/412.1 |
| 2007/0242809 A1* | 10/2007 | Mousseau et al. | 379/88.18 |
| 2007/0294533 A1* | 12/2007 | Toh et al. | 713/170 |
| 2009/0172407 A1* | 7/2009 | Smith et al. | 713/183 |

OTHER PUBLICATIONS

International Search Report of Application No. PCT/CA2005/000651, date of mailing Aug. 29, 2005—11 pgs.

Article 94(3) EPC Communication, issued Jan. 31, 2008, for European Application No. EP05738275.

Dawn Xiading Song et al, "Practical Techniques for Searches on Encrypted Data", Proceedings of 2000 IEEE Symp. On Security and Privacy S&P 2000, May 2000, pp. 44-55.

Menezes, A., Chapter 1: Overview of Cryptography ED, Handbook of Applied Cryptography, Oct. 1, 1996, 1-48, CRC Press, Boca Raton, Florida US.

European Search Report, Oct. 5, 2009, European Patent App. No. 09008474.0.

Supplemental Search Report issued in European Application No. 05738275.6 on Sep. 21, 2007; 4 pages.

Minutes of Oral Proceedings issued in European Application No. 05738275.6 on Dec. 21, 2009; 14 pages.

Decision to Refuse a European Patent Application issued in European Application No. 05738275.6 on Dec. 23, 2009; 21 pages.

Communication Pursuant to Article 94(3) EPC issued in European Application No. 09008474.0 on Mar. 1, 2010; 1 page.

International Preliminary Report on Patentability issued in International Application No. PCT/CA2005/000651 on Nov. 1, 2006; 6 pages.

Office Action issued in Canadian Application No. 2,564,268 on Mar. 23, 2010, 2 pages.

Office Action issued in Canadian Application No. 2,564,268 on Feb. 7, 2012; 3 pages.

Ramsdell, B.; "S/MIME Version 3 Message Specification"; Jun. 1999; XP015008416; ISSN: 0000-0003.

Communication Pursuant to Article 94(3) EPC issued in European Application No. 09008474.0 on Feb. 15, 2013; 9 pages.

Notice of Allowance issued in Canadian Application No. 2,564,268 on May 7, 2013; 1 page.

* cited by examiner

SYSTEM AND METHOD FOR SEARCHING SECURE ELECTRONIC MESSAGES

CROSS-REFERENCE TO RELATED APPLICATION

This application claims the benefit of and priority to, and incorporates by reference in its entirety for all purposes, commonly assigned U.S. Provisional Application Ser. No. 60/567,134, filed on Apr. 30, 2004, entitled "SYSTEM AND METHOD FOR SEARCHING SECURE ELECTRONIC MESSAGES."

BACKGROUND

1. Technical Field

The present invention relates generally to the field of communications, and in particular to handling secure electronic messages on mobile wireless communications devices.

2. Description of the Related Art

Most applications handling electronic messages (e.g., e-mail messages) allow a user to not only view a message, but to also search for messages that contain desired text. Unfortunately, this search capability does not work in the case of secure e-mail. For example, the Outlook e-mail program from Microsoft does not allow a user to search S/MIME messages.

DETAILED DESCRIPTION OF THE DRAWINGS

Figure 1:
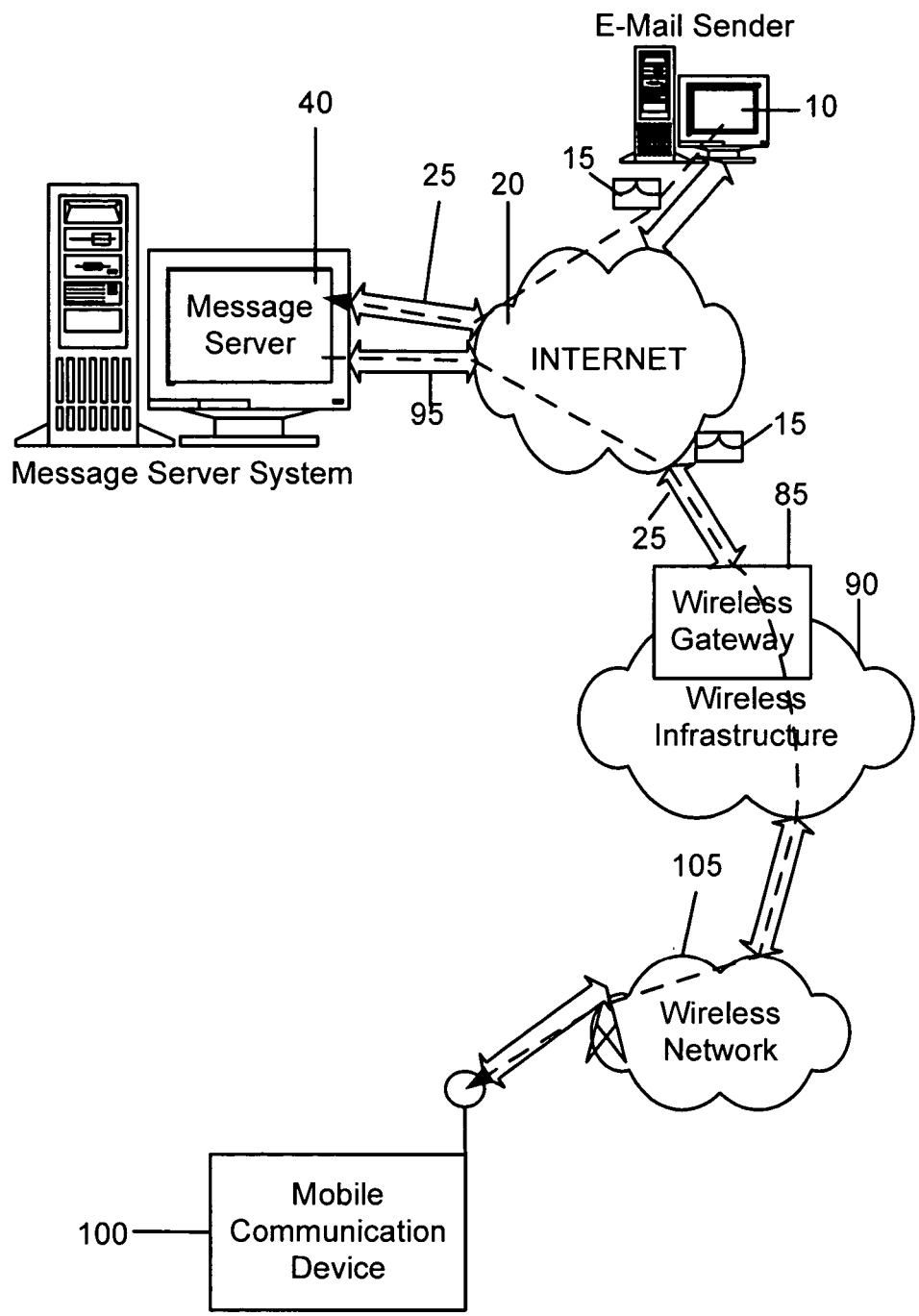
FIG. 1 is an overview of an example communication system in which a wireless communication device may be used.

FIG. 1 is an overview of an example communication system in which a wireless communication device may be used. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have pre-defined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
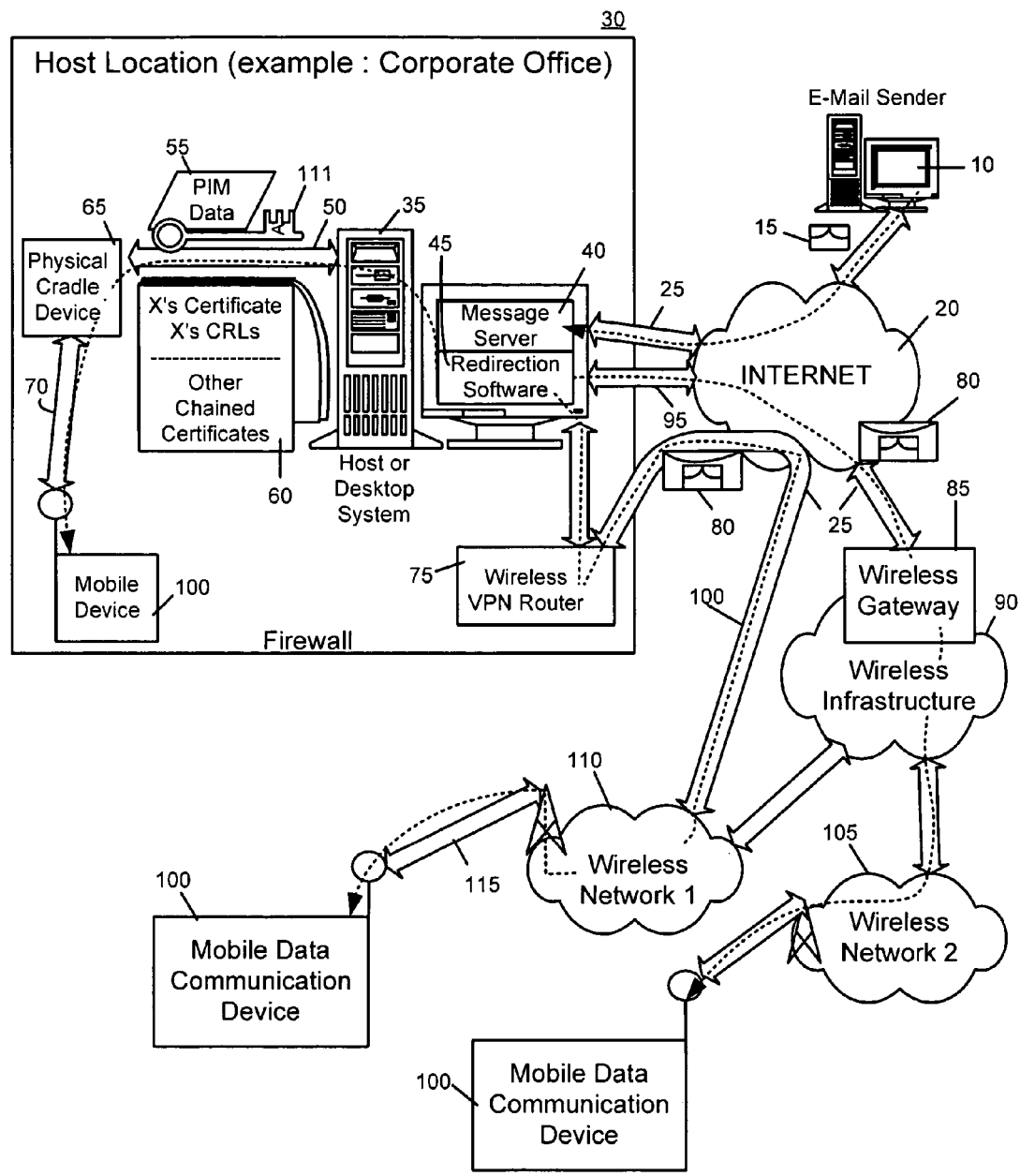
FIG. 2 is a block diagram of a further example communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on some computer within the firewall of the host system, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 patent"), entitled "System and Method for Pushing Information From A Host System To A Mobile Data Communication Device Having A Shared Electronic Address", and issued to the assignee of the instant application on Apr. 17, 2001 which is hereby incorporated into the present application by reference. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintain the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
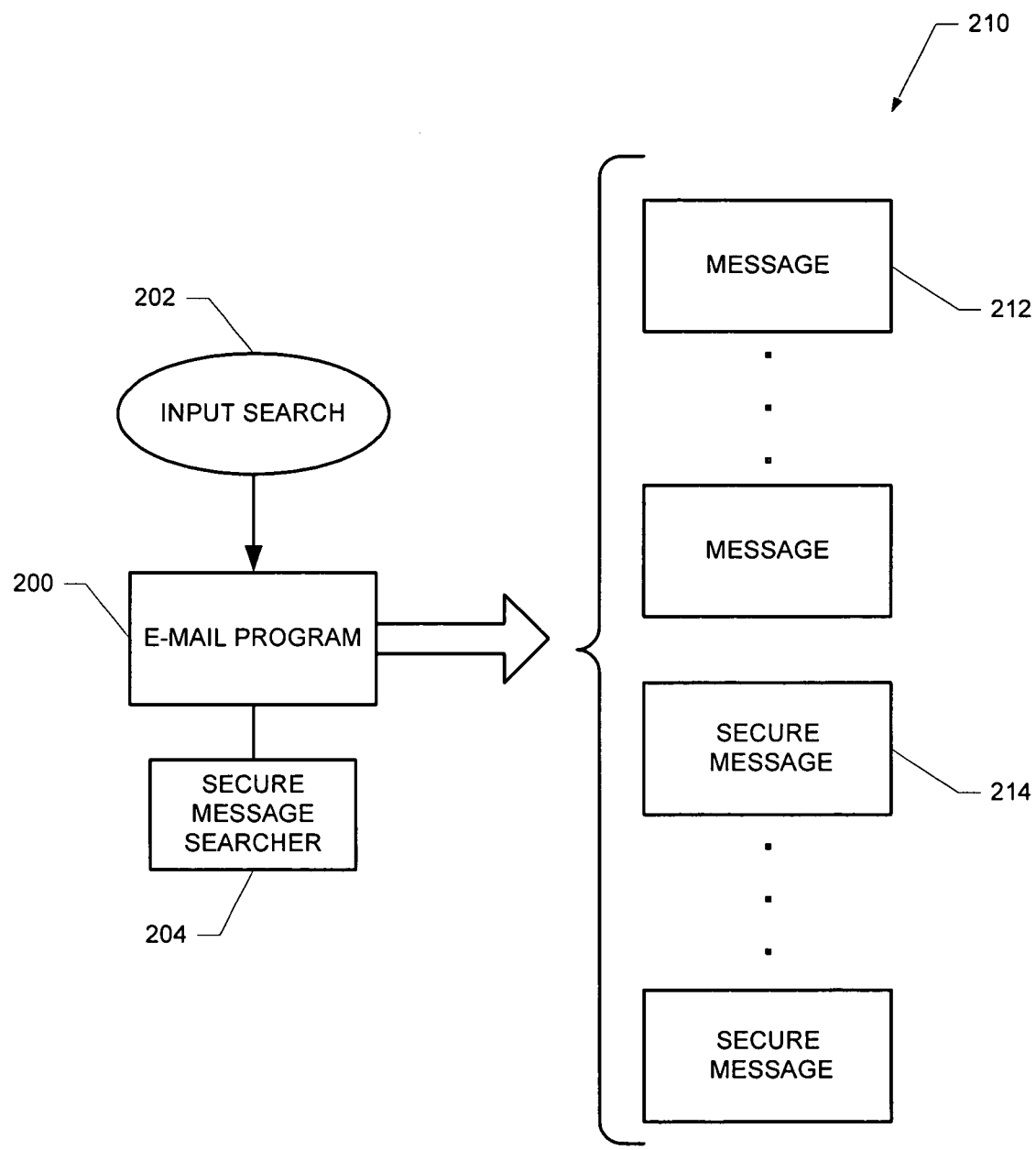
FIGS. 3 and 4 are block diagrams depicting the searching of secure electronic messages.

FIG. 3 depicts a system for searching electronic messages 210, including functionality to search secure messages (e.g., secure message 214). An e-mail handling program 200 (or other application) receives an input search 202 by which to search the messages 210. The input search 202 can be for example a text string containing key words for searching the bodies of the messages 210. The bodies of unsecured messages (e.g., message 212) can be directly searched since their message bodies are plain text and unsecured. However, the e-mail program 200 accesses a secure message searcher 204 in order to handle the searching of secure messages. The searching of secure messages can involve searching any secured message aspect (e.g., secure text, information about the content, etc.). However, it should be understood that a system may be configured to search for both secured message aspects as well as searching insecure message aspects (e.g., recipient addressing information, subject information, etc.). These techniques can be extended to any secured message attribute in order to facilitate searching based on criteria other than message body key words.

Figure 4:
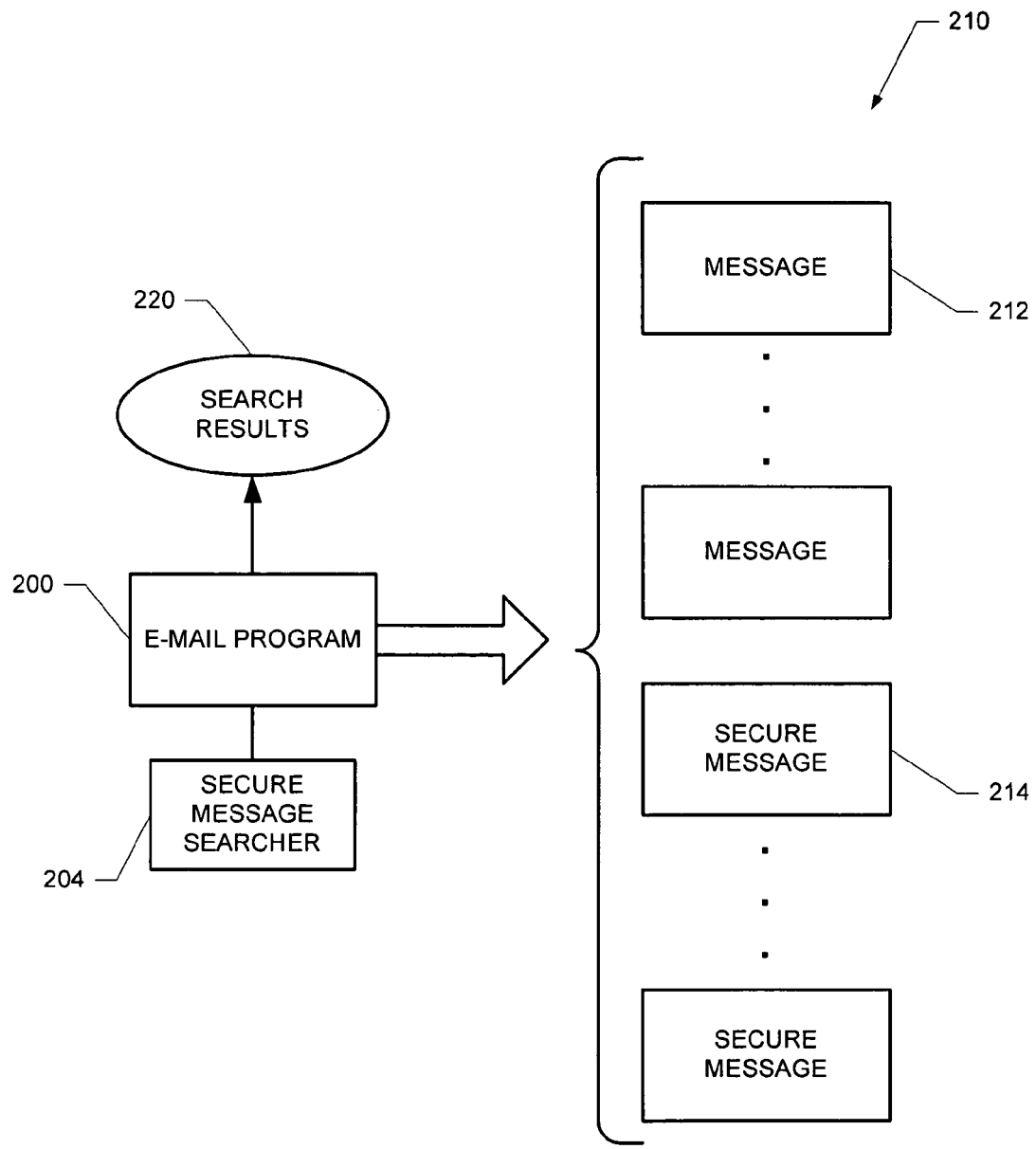

The secure message searcher 204 allows the searching of e-mail content that has been secured, such as through encryption, to determine whether it matches the input search 202. As shown on FIG. 4, the messages that match the input search 202 are made available as search results 220. The format of the search results 220 can vary greatly. For example, the search results 220 may provide a list of the messages (including any secure messages) that satisfy the input search 202, or some other format that satisfies the needs of the search requester.

Figure 5:
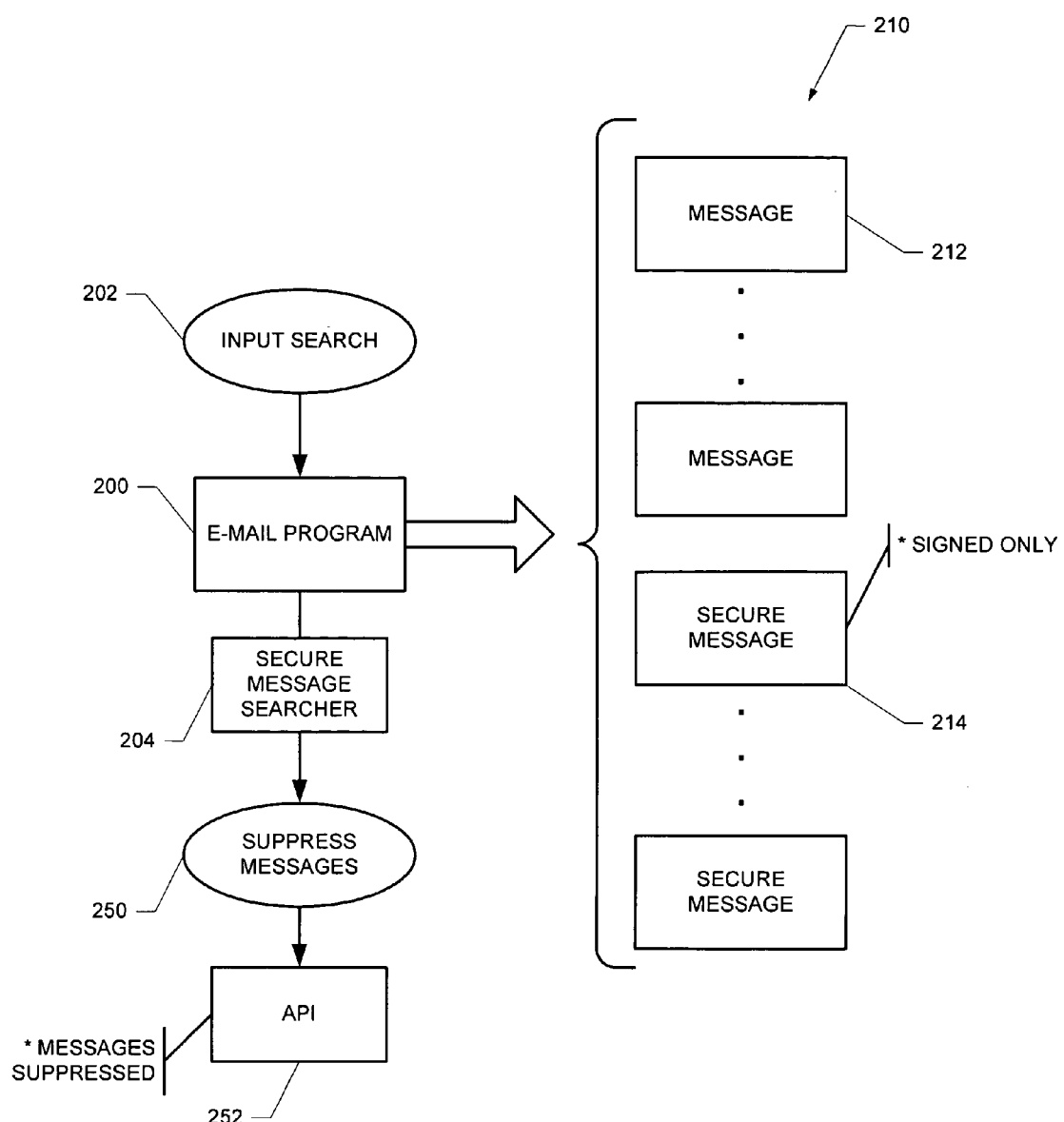
FIG. 5 is a block diagram depicting searching messages that have only been digitally signed.

Messages 210 can be secured in a number of different ways. FIG. 5 depicts the secure message searcher 204 searching messages that have only been digitally signed. In such situations, the secure message searcher 204 causes the suppression of any user interface messages to the user that would have been generated as a result of processing a digitally signed messages. As an illustration, the secure message searcher 204 may instruct underlying mobile device cryptographic APIs (for S/MIME and PGP for example) to not display user interface messages during the search, such as digital signature verification status messages.

Figure 6:
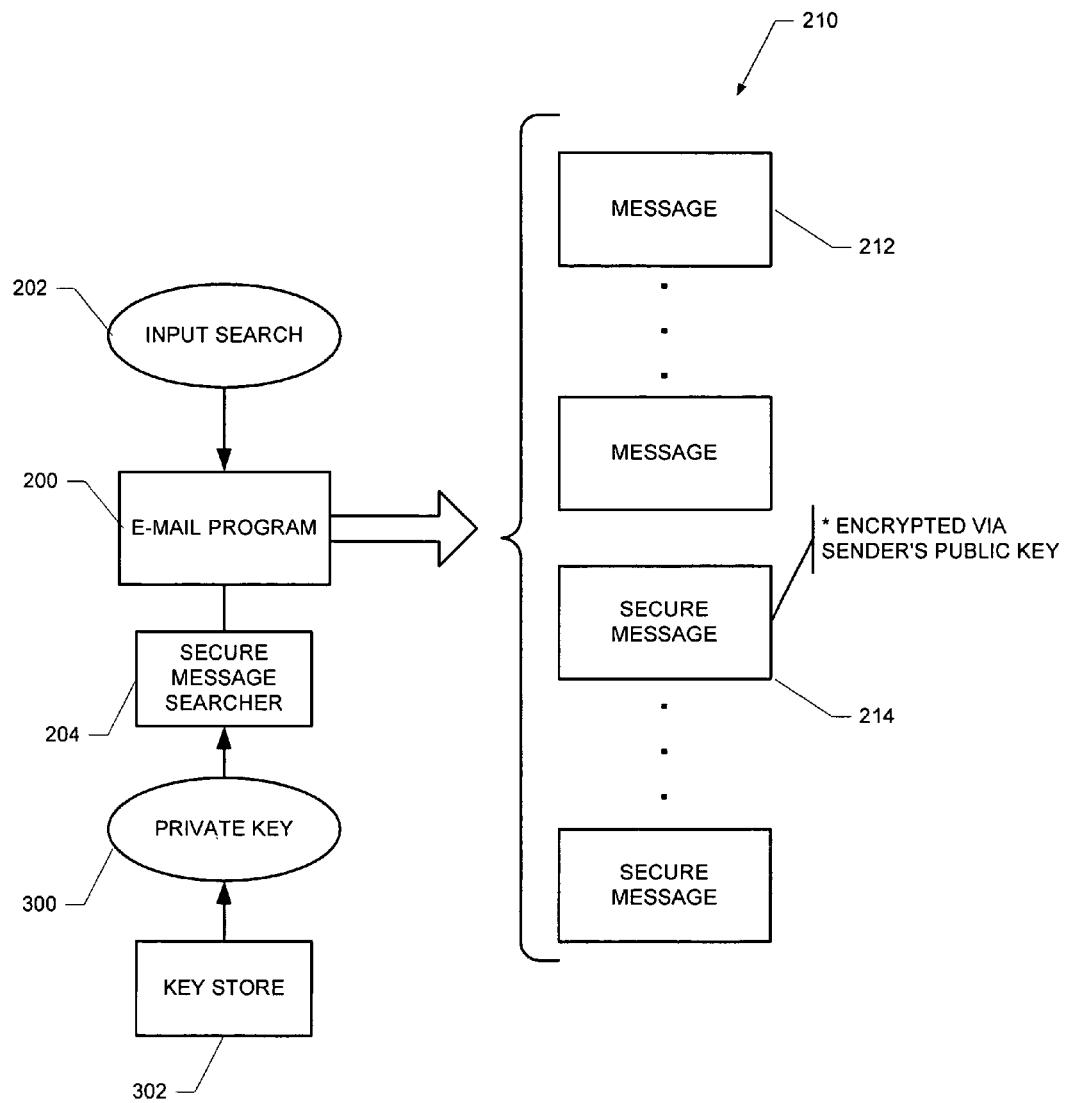
FIG. 6 is a block diagram depicting searching messages that have been encrypted via a public key.

As another example of a secure message type, FIG. 6 depicts the secure message searcher 204 searching messages that have been encrypted via a public key (e.g., the message recipient's public key). On the mobile device, the corresponding private key can be stored in a data store, such as a key store 302. As an example, the secure message searcher 204 can retrieve the private key 300 from the key store 302 for use in decrypting a secure message. Once decrypted, the body of a secure message can be examined to determine whether the secure message matches the input search 202. In some key store implementations, retrieving or using the private key may cause the user to be prompted to enter a password that protects the key store or the private key.

As another example in accessing keys, the secure message searcher 204 could also request authorization from the key store 302 to have continued access to a required private key. This authorization may be in the form of an authorization ticket that is issued to the secure message searcher 204 allowing it to access a particular private key 300 stored in the key store 302, possibly for an extended period of time. The user would have to enter their password only once to access the private key, at which point the authorization ticket is issued to the secure message searcher 204. After the private key 300 has been retrieved and the authorization ticket issued, the user will not be continuously prompted for a password when that private key is needed to decrypt the secure messages. While the search is occurring, the secure message searcher 204 has the authorization ticket for the private key so that it can "silently" open and search messages (e.g., without user interface messages being generated) that have been encrypted via the public key corresponding to the private key for which the ticket was issued. If some messages have been encrypted via different public keys, the user will be prompted to grant access to each of the corresponding private keys.

In an alternate embodiment, the user could be prompted once to grant authorization for the message searcher to access all contents of the key store 302, including all private keys contained therein. In this alternate embodiment, the user will be prompted only once to grant access to the key store 302, and the secure message searcher will be able to "silently" open and search messages (e.g., without user interface messages being generated) that have been encrypted via the public key corresponding to any of the private keys stored in the key store 302.

Figure 7:
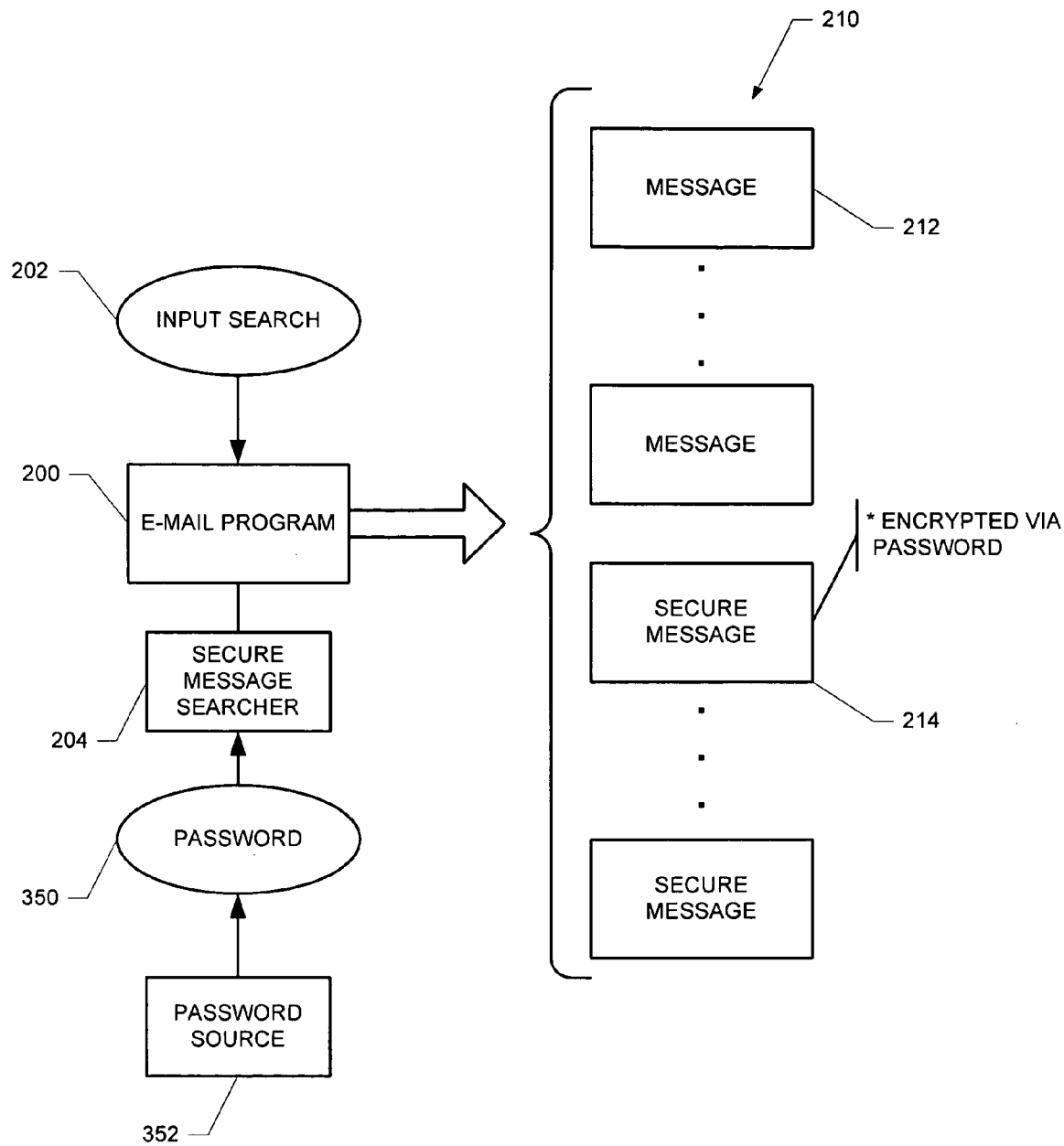
FIG. 7 is a block diagram depicting searching messages that have been encrypted via a password.

FIG. 7 depicts the secure message searcher 204 searching messages that have been encrypted via a password. In this situation, the password 350 is obtained from a password source 352 by the secure message searcher 204. The password source 352 can be a person supplying the password 350, or a data store that holds password information. A data store can be configured to store one or more passwords. As an illustration, the data store can keep track of which passwords have been used for which messages. Password information can be obtained and stored in a data store at the time when the user supplied the password in order to open the message for the first time.

As another example to access passwords, a mobile device may have a password keeper software program that caches all passwords used on the mobile device. The secure message searcher 204 requests an authorization ticket for full access to the password keeper software program and the cached contents. This may require the user to enter their password prior to issuance of the authorization ticket. However, the user will only be prompted once per search for the password. When the secure message searcher 204 encounters a message encrypted with a password, the secure message searcher 204 can use the password keeper software program to request the appropriate password. If it finds it, then the message can be decrypted and searched, otherwise the message is skipped by the secure message searcher 204.

Figure 8:
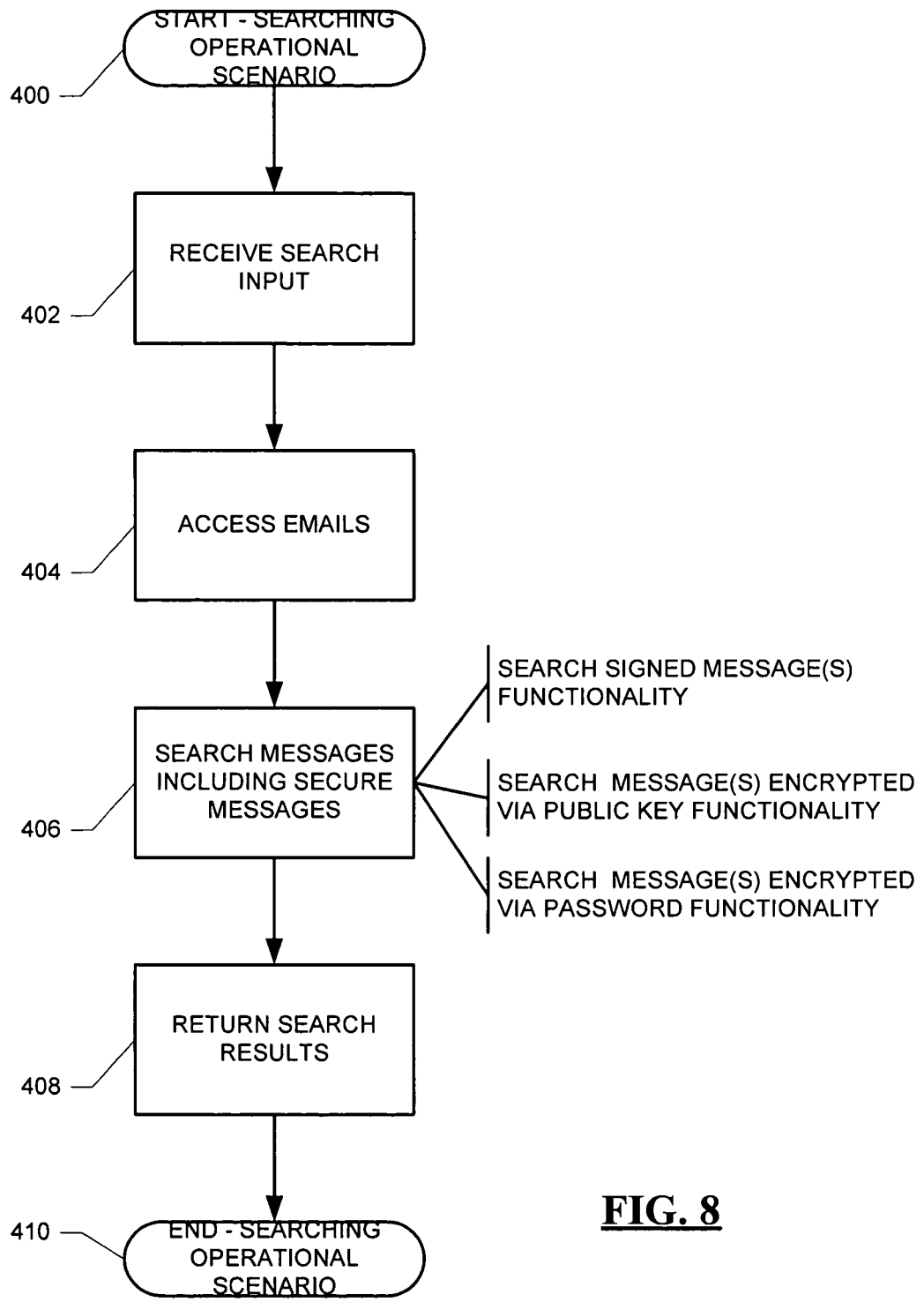
FIG. 8 is a flowchart depicting an operational scenario for searching secure e-mail messages.

FIG. 8 depicts an operational scenario 400 for searching e-mail messages that include secure e-mail messages. At step 402, input is received for use in searching e-mail messages. The e-mails to be searched are accessed (e.g., opened) at step 404. At step 406, the messages are searched. In this operational scenario, secure messages form part of the corpus of e-mails to be searched.

To perform step 406 in this operational scenario, the secure message searcher can search signed only messages, messages that are encrypted via a public key, as well as messages that are encrypted via a password. The secure message searcher includes functionality to search for all of these types of secure messages, but it could be configured to only search for fewer than all of these types of secure messages. It is noted that the secure message searcher can search messages that have been both signed and encrypted in some way. The e-mail messages that match the search input are returned as search results to the requester. Processing for this operational scenario terminates at end block 410.

It should be understood that similar to the other processing flows described herein, the steps and the order of the steps in the flowchart described herein may be altered, modified and/or augmented and still achieve the desired outcome. For example, while the search is being performed upon the e-mail messages, the secure message searcher can search through secure e-mail messages. It is noted that during the searching, the user may be prompted for a password in order to search a secured e-mail messages. However, the secure message searcher minimizes the number of times the user is prompted for a password when searching secure messages.

Figure 9:
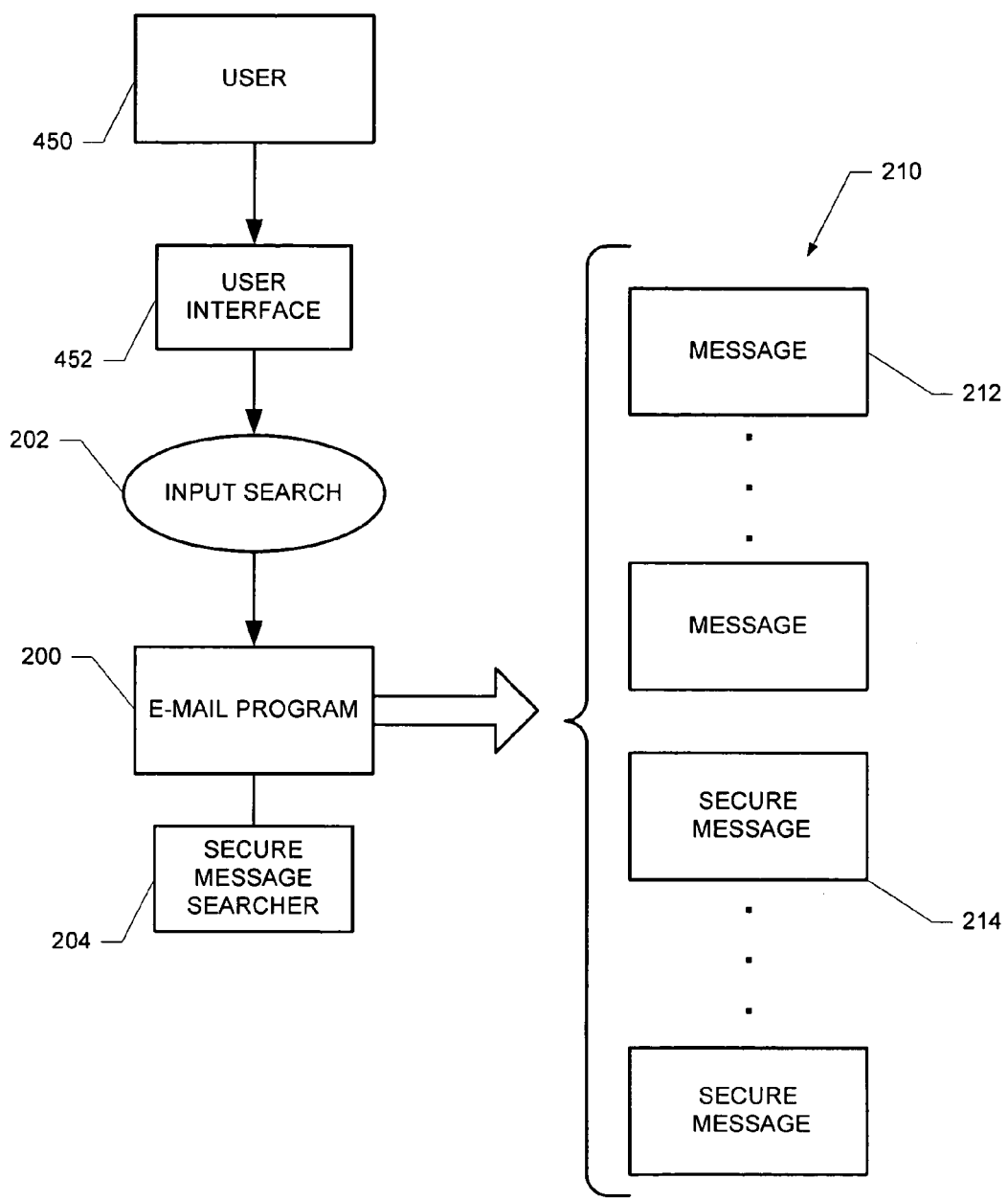
FIGS. 9 and 10 are block diagrams depicting various search requesters.
Figure 10:
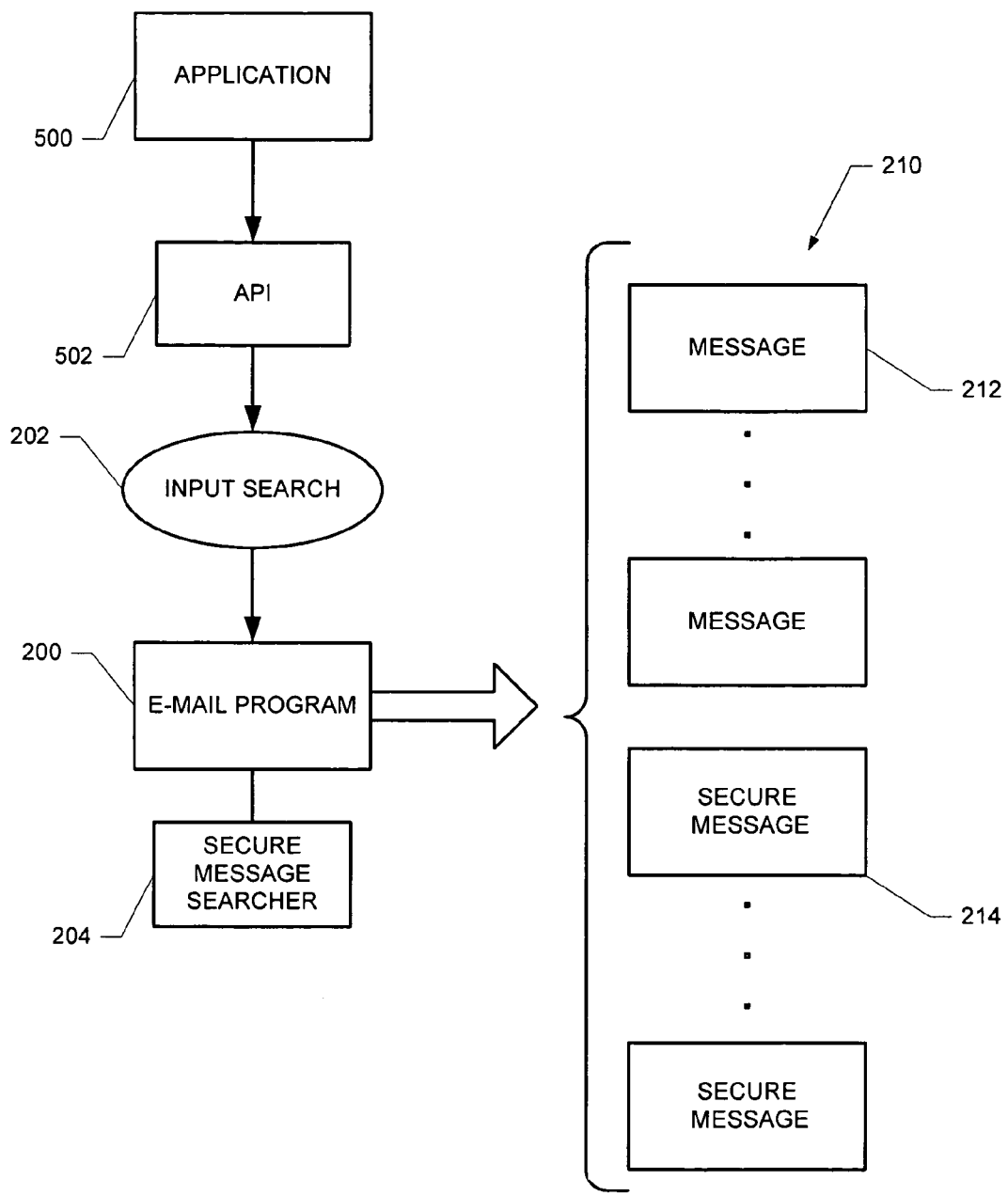

The systems and methods disclosed herein are presented only by way of example and are not meant to limit the scope of the invention. Other variations of the systems and methods described above will be apparent to those skilled in the art and as such are considered to be within the scope of the invention. For example as shown in FIGS. 9 and 10, the requester of the search can vary depending upon the situation at hand. For example, a requester may be a user 450 of the mobile device. The user 450 can utilize a user interface 452 of the mobile device in order to provide the input search 202 and to view the search results on the user interface 452. As shown on FIG. 10, the requester may also be a software program 500 operating on the mobile device. The application 500 can utilize an API 502 to communicate the input search 202 to the e-mail searching program 200 and to receive the search results.

As another example, the systems and methods disclosed herein may be configured in various ways. As an illustration of a system and method, an input search is received for use in searching content of electronic messages. The search includes searching content of secure electronic messages. The results of the search are provided. A method and system can also be configured wherein the secure electronic message is a message encrypted using a public key. The corresponding private key can be retrieved from a key data store and used to decrypt the secure electronic message.

A method and system can be configured wherein a prompt is provided to a user for each private key that is needed to decrypt a secure electronic message whose content is to be searched. A prompt can also be provided to a user in order to grant access to all private keys stored in a key data store; wherein the private keys that are accessed from the key data store are used to decrypt content of secure messages. If the secure electronic message is a digitally signed message, the signed message can be processed such that no or only one user prompt is generated that is required to search the signed message.

If the secure electronic message is a message encrypted using a password, the password can be retrieved from a data store and used to decrypt the secure electronic message in order to perform a search of the message's content. Also, if the secure electronic message is a message encrypted using a first password, the user can be prompted once for a second password that is associated with a password keeper data store or application. The second password provided through the prompting of the user is used to access the first password that was used to encrypt the secure electronic message. The accessed first password is used to decrypt the secure electronic message in order to perform a search of the message's content. The second password provided through the prompting of the user can also be used to access passwords of other secure electronic messages whose contents are to be searched based upon the input search.

As another example, an apparatus can be provided with a search input mechanism. The search input mechanism receives an input search from a requester. A secure message searcher searches through content of secure electronic messages based upon the input search. A result is provided to the requester based upon the electronic message searching.

Figure 11:
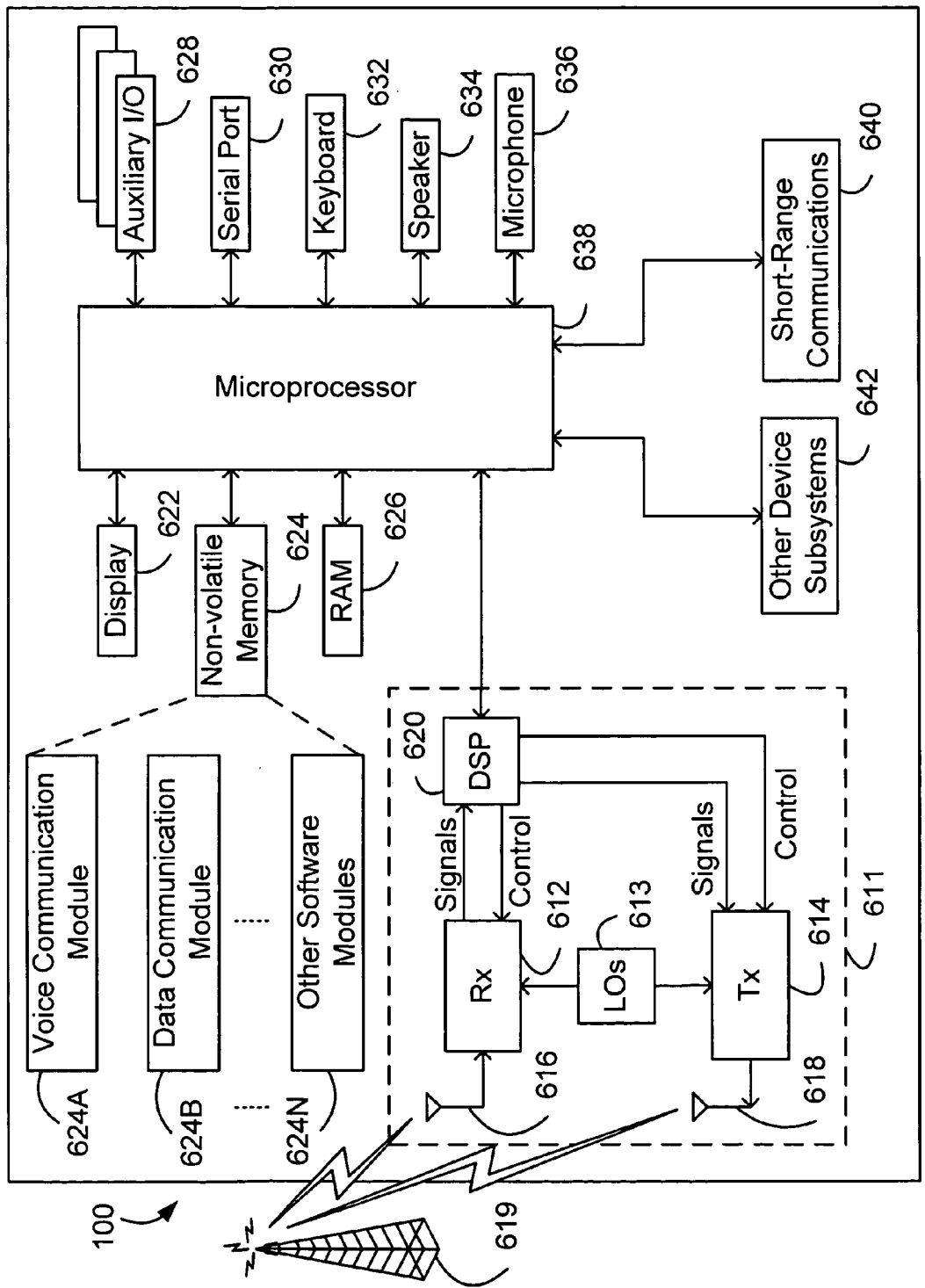
FIG. 11 is a block diagram of an example mobile device.

The systems and methods disclosed herein may be used with many different computers and devices, such as a wireless mobile communications device shown in FIG. 11. With reference to FIG. 11, the mobile device 100 is a dual-mode mobile device and includes a transceiver 611, a microprocessor 638, a display 622, non-volatile memory 624, random access memory (RAM) 626, one or more auxiliary input/output (I/O) devices 628, a serial port 630, a keyboard 632, a speaker 634, a microphone 636, a short-range wireless communications sub-system 640, and other device sub-systems 642.

The transceiver 611 includes a receiver 612, a transmitter 614, antennas 616 and 618, one or more local oscillators 613, and a digital signal processor (DSP) 620. The antennas 616 and 618 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 11 by the communication tower 619. These voice and data networks may be separate communication networks using separate infrastructure, such as base stations, network controllers, etc., or they may be integrated into a single wireless network.

The transceiver 611 is used to communicate with the network 619, and includes the receiver 612, the transmitter 614, the one or more local oscillators 613 and the DSP 620. The DSP 620 is used to send and receive signals to and from the transceivers 616 and 618, and also provides control information to the receiver 612 and the transmitter 614. If the voice and data communications occur at a single frequency, or closely-spaced sets of frequencies, then a single local oscillator 613 may be used in conjunction with the receiver 612 and the transmitter 614. Alternatively, if different frequencies are utilized for voice communications versus data communications for example, then a plurality of local oscillators 613 can be used to generate a plurality of frequencies corresponding to the voice and data networks 619. Information, which includes both voice and data information, is communicated to and from the transceiver 611 via a link between the DSP 620 and the microprocessor 638.

The detailed design of the transceiver 611, such as frequency band, component selection, power level, etc., will be dependent upon the communication network 619 in which the mobile device 100 is intended to operate. For example, a mobile device 100 intended to operate in a North American market may include a transceiver 611 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 619, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 619, other than any legally required operations, such as '911' emergency calling.

After any required network registration or activation procedures have been completed, the mobile device 100 may the send and receive communication signals, including both voice and data signals, over the networks 619. Signals received by the antenna 616 from the communication network 619 are routed to the receiver 612, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 620. In a similar manner, signals to be transmitted to the network 619 are processed, including modulation and encoding, for example, by the DSP 620 and are then provided to the transmitter 614 for digital to analog conversion, frequency up conversion, filtering, amplification and transmission to the communication network 619 via the antenna 618.

In addition to processing the communication signals, the DSP 620 also provides for transceiver control. For example, the gain levels applied to communication signals in the receiver 612 and the transmitter 614 may be adaptively controlled through automatic gain control algorithms implemented in the DSP 620. Other transceiver control algorithms could also be implemented in the DSP 620 in order to provide more sophisticated control of the transceiver 611.

The microprocessor 638 preferably manages and controls the overall operation of the mobile device 100. Many types of microprocessors or microcontrollers could be used here, or, alternatively, a single DSP 620 could be used to carry out the functions of the microprocessor 638. Low-level communication functions, including at least data and voice communications, are performed through the DSP 620 in the transceiver 611. Other, high-level communication applications, such as a voice communication application 624A, and a data communication application 624B may be stored in the non-volatile memory 624 for execution by the microprocessor 638. For example, the voice communication module 624A may provide a high-level user interface operable to transmit and receive voice calls between the mobile device 100 and a plurality of other voice or dual-mode devices via the network 619. Similarly, the data communication module 624B may provide a high-level user interface operable for sending and receiving data, such as e-mail messages, files, organizer information, short text messages, etc., between the mobile device 100 and a plurality of other data devices via the networks 619.

The microprocessor 638 also interacts with other device subsystems, such as the display 622, the RAM 626, the auxiliary input/output (I/O) subsystems 628, the serial port 630, the keyboard 632, the speaker 634, the microphone 636, the short-range communications subsystem 640 and any other device subsystems generally designated as 642.

Some of the subsystems shown in FIG. 11 perform communication-related functions, whereas other subsystems may provide "resident" or on-device functions. Notably, some subsystems, such as the keyboard 632 and the display 622 may be used for both communication-related functions, such as entering a text message for transmission over a data communication network, and device-resident functions such as a calculator or task list or other PDA type functions.

Operating system software used by the microprocessor 638 is preferably stored in a persistent store such as non-volatile memory 624. The non-volatile memory 624 may be implemented, for example, as a Flash memory component, or as battery backed-up RAM. In addition to the operating system, which controls low-level functions of the mobile device 610, the non-volatile memory 624 includes a plurality of software modules 624A-624N that can be executed by the microprocessor 638 (and/or the DSP 620), including a voice communication module 624A, a data communication module 624B, and a plurality of other operational modules 624N for carrying out a plurality of other functions. These modules are executed by the microprocessor 638 and provide a high-level interface between a user and the mobile device 100. This interface typically includes a graphical component provided through the display 622, and an input/output component provided through the auxiliary I/O 628, keyboard 632, speaker 634, and microphone 636. The operating system, specific device applications or modules, or parts thereof, may be temporarily loaded into a volatile store, such as RAM 626 for faster operation. Moreover, received communication signals may also be temporarily stored to RAM 626, before permanently writing them to a file system located in a persistent store such as the Flash memory 624.

An exemplary application module 624N that may be loaded onto the mobile device 100 is a personal information manager (PIM) application providing PDA functionality, such as calendar events, appointments, and task items. This module 624N may also interact with the voice communication module 624A for managing phone calls, voice mails, etc., and may also interact with the data communication module for managing e-mail communications and other data transmissions. Alternatively, all of the functionality of the voice communication module 624A and the data communication module 624B may be integrated into the PIM module.

The non-volatile memory 624 preferably also provides a file system to facilitate storage of PIM data items on the device. The PIM application preferably includes the ability to send and receive data items, either by itself, or in conjunction with the voice and data communication modules 624A, 624B, via the wireless networks 619. The PIM data items are preferably seamlessly integrated, synchronized and updated, via the wireless networks 619, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 626. Such information may instead be stored in the non-volatile memory 624, for example, when storage intervals are relatively short, such that the information is removed from memory soon after it is stored. However, storage of this information in the RAM 626 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 630 of the mobile device 100 to the serial port of a computer system or device. The serial port 630 may also be used to enable a user to set preferences through an external device or software application, or to download other application modules 624N for installation. This wired download path may be used to load an encryption key onto the device, which is a more secure method than exchanging encryption information via the wireless network 619. Interfaces for other wired download paths may be provided in the mobile device 100, in addition to or instead of the serial port 630. For example, a USB port would provide an interface to a similarly equipped personal computer.

Additional application modules 624N may be loaded onto the mobile device 100 through the networks 619, through an auxiliary I/O subsystem 628, through the serial port 630, through the short-range communications subsystem 640, or through any other suitable subsystem 642, and installed by a user in the non-volatile memory 624 or RAM 626. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 611 and provided to the microprocessor 638, which preferably further processes the received signal in multiple stages as described above, for eventual output to the display 622, or, alternatively, to an auxiliary I/O device 628. A user of mobile device 100 may also compose data items, such as e-mail messages, using the keyboard 632, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 628, which may include a thumbwheel input device, a touchpad, a variety of switches, a rocker input switch, etc. The composed data items input by the user may then be transmitted over the communication networks 619 via the transceiver module 611.

When the mobile device 100 is operating in a voice communication mode, the overall operation of the mobile device is substantially similar to the data mode, except that received signals are preferably be output to the speaker 634 and voice signals for transmission are generated by a microphone 636. Alternative voice or audio I/O subsystems, such as a voice message recording subsystem, may also be implemented on the mobile device 100. Although voice or audio signal output is preferably accomplished primarily through the speaker 634, the display 622 may also be used to provide an indication of the identity of a calling party, the duration of a voice call, or other voice call related information. For example, the microprocessor 638, in conjunction with the voice communication module and the operating system software, may detect the caller identification information of an incoming voice call and display it on the display 622.

A short-range communications subsystem 640 is also included in the mobile device 100. The subsystem 640 may include an infrared device and associated circuits and components, or a short-range RF communication module such as a Bluetooth™ module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

What is claimed:

1. A method for searching secure electronic messages, comprising:
    receiving an input search at a mobile device;
    wherein the input search is used to search a secure message aspect;
    searching through content of electronic messages using the input search, the electronic messages stored at the mobile device;
    wherein the searching includes searching through content of a secure electronic message using the input search;
    wherein the secure electronic message is a message encrypted using a public key;
    wherein an authorization is obtained to access a private key corresponding to the public key for a period of time, and wherein the private key is stored in a key data store at the mobile device, the stored private key associated with the corresponding public key in the key data store, wherein obtaining the authorization comprises:
        providing only once a user prompt for a password that is associated with the key data store; and
        using the password provided through the user prompt to access the private key from the key data store;
    wherein the private key is retrieved from the key data store when authorization is obtained, and the private key is used to decrypt the secure electronic message and at least one other secure electronic message at the mobile device without further user prompt, the secure electronic message and the at least one other secure electronic message encrypted using the public key prior to the searching through the content of the secure electronic message and of the at least one other secure electronic message; and
    providing a result based upon the searching of the electronic messages;
    wherein the input search is received from a user recipient of the electronic messages or from a computer application utilizing an application programming interface to provide the input search.

2. The method of claim 1, wherein the input search is a text string containing one or more key words for searching bodies of the electronic messages.

3. The method of claim 1, wherein a prompt is provided to a user for each private key that is needed to decrypt a secure electronic message whose content is to be searched.

4. The method of claim 1, wherein the prompt is provided to a user in order to grant access to all private keys stored in the key data store; wherein the private keys that are accessed from the key data store are used to decrypt content of secure electronic messages.

5. The method of claim 1, wherein the secure electronic message comprises a digitally signed message, said method further comprising the step of processing the digitally signed message; wherein the processing of the digitally signed message includes decoding the signed message.

6. The method of claim 1, wherein the secure electronic message comprises a digitally signed message, wherein the digitally signed message is processed such that no or only one user prompt is generated that is required to search the signed message.

7. The method of claim 1, wherein the searching is performed upon a wireless mobile communications device that receives messages over a wireless communication network.

8. The method of claim 1, wherein the content includes textual content.

9. The method of claim 1, wherein the result includes a list of messages that satisfy the input search.

10. The method of claim 9, wherein the list of messages includes the secure electronic message.

11. A mobile device having a data processor for searching content of electronic messages, wherein the electronic messages include a secure electronic message, the mobile device comprising:
a memory having instructions thereon;
the data processor coupled to the memory and configured by instructions to perform the operations of:
executing on the data processor and for receiving an input search;
wherein the input search is used to search contents of the secure electronic message, the secure electronic messages stored at the mobile device;
decrypting the secure electronic message;
wherein the secure electronic message is a message encrypted using a public key;
wherein an authorization is obtained to access a private key corresponding to the public key for a period of time, and wherein the private key is stored in a key data store at the mobile device, the stored private key associated with the corresponding public key in the key data store, wherein obtaining the authorization comprises:
providing only once a user prompt for a password that is associated with the key data store; and
using the password provided through the user prompt to access the private key from the key data store;
wherein the decrypting of the secure electronic message includes retrieving the private key from the key data store when authorization is obtained, and using the private key to decrypt the secure electronic message and at least one other secure electronic message at the mobile device, the secure electronic message and the at least one other secure electronic message encrypted using the public key prior to the searching through the content of the secure electronic message and of the at least one other secure electronic message; and
executing on the data processor and for searching textual content of a decrypted electronic message based upon the input search and for searching textual content of an unsecure electronic message based upon the input search;
wherein the results associated with the searching are provided for use by a requester;
wherein the input search is received from a user recipient of the electronic messages or from a computer application utilizing an application programming interface to provide the input search.

12. A non-transitory, computer-readable storage medium encoded with instructions that cause a processor-implemented device to perform a method, said method for searching secure electronic messages, said method comprising:
receiving an input search at a mobile device; and
searching through content of electronic messages using the input search, the electronic messages stored at the mobile device;
wherein the searching includes searching through content of a secure electronic message using the input search;
wherein the secure electronic message is a message encrypted using a public key;
wherein an authorization is obtained to access a private key corresponding to the public key for a period of time, and wherein the private key is stored in a key data store at the mobile device, the stored private key associated with the corresponding public key in the key data store, wherein obtaining the authorization comprises:
providing only once a user prompt for a password that is associated with the key data store; and
using the password provided through the user prompt to access the private key from the key data store;
wherein the private key is retrieved from the key data store when authorization is obtained, and, the private key is used to decrypt the secure electronic message and at least one other secure electronic message at the mobile device without further user prompt, the secure electronic message and the at least one other secure electronic message encrypted using the public key prior to the searching through the content of the secure electronic message and of the at least one other secure electronic message; and
providing a result based upon the searching of the electronic messages;
wherein the input search is received from a user recipient of the electronic messages or from a computer application utilizing an application programming interface to provide the input search.

13. A system for searching through content of electronic messages, wherein the electronic messages include a secure electronic message, comprising:
a search input mechanism configured to execute on a data processor and to receive an input search;
a secure message searcher configured to execute on the data processor and to search through content of the secure electronic message based upon the input search, the secure electronic message stored on a mobile device;
wherein the secure electronic message is a message encrypted using a public key;
wherein an authorization is obtained to access a private key corresponding to the public key for a period of time, and wherein the private key is stored in a key data store at a mobile device, the stored private key associated with the corresponding public key in the key data store, wherein obtaining the authorization comprises:
providing only once a user prompt for a password that is associated with the key data store; and
using the password provided through the user prompt to access the private key from the key data store;
wherein the private key is retrieved from the key data store when authorization is obtained, and the private key is used by the secure message searcher to decrypt the secure electronic message and at least one other secure electronic message at the mobile device without further user prompt, the secure electronic message and the at least one other secure electronic message encrypted using the public key prior to searching through the content of the secure electronic message and of the at least one other secure electronic message;

wherein a result is provided based upon the electronic message searching.

14. A method for searching secure electronic messages on a mobile device that has a data processor, comprising:
receiving an input search;
searching through content of electronic messages using the input search;
wherein the searching includes searching through content of a particular secure electronic message using the input search;
wherein the particular secure electronic message is a message encrypted using a first password;
providing only once a user prompt for a second password that is associated with a password keeper data store or application separate from the electronic messages, wherein the password keeper data store or application stores multiple different passwords, each password identified in the password keeper data store or application as associated with one or more of the secure electronic messages;
using the second password provided through the user prompt to access the first password identified as associated with the particular secure electronic message and that was used to encrypt the particular secure electronic message, the first password stored with the multiple different passwords by the password keeper data store or application, wherein using the second password provided through the user prompt to access the first password provides access to the first password;
using the first password accessed from the password keeper data store or application to decrypt corresponding electronic messages encrypted by the first password including the particular secure electronic message in order to perform a search of the message's content; and
providing a result based upon the searching of the electronic messages;
wherein the input search is received from a user recipient of the electronic messages or from a computer application utilizing an application programming interface to provide the input search.

15. The method of claim 14, wherein the second password provided through the user prompt is used to access one or more of the other different passwords of other secure electronic messages whose contents are to be searched based upon the input search.

16. The method of claim 14, wherein the input search is a text string containing one or more key words for searching bodies of the electronic messages.

17. The method of claim 14, wherein the particular secure electronic message comprises a digitally signed message, said method further comprising the step of processing the digitally signed message; wherein the processing of the digitally signed message includes decoding the digitally signed message.

18. The method of claim 14, wherein the particular secure electronic message comprises a digitally signed message, wherein the digitally signed message is processed such that no or only one user prompt is generated that is required to search the signed message.

19. The method of claim 14, wherein the searching is performed upon a wireless mobile communications device that receives messages over a wireless communication network.

20. The method of claim 14, wherein the content includes textual content.

21. The method of claim 14, wherein the result includes a list of messages that satisfy the input search.

22. The method of claim 21, wherein the list of messages includes the particular secure electronic message.

23. A mobile device having a data processor for searching secure electronic messages, comprising:
a memory having instructions thereon;
the data processor coupled to the memory and configured by instructions to perform the operations of:
executing on the data processor and for receiving an input search;
searching through content of electronic messages using the input search;
wherein the searching includes searching through content of a particular secure electronic message using the input search;
wherein the particular secure electronic message is a message encrypted using a first password;
providing only once a user prompt for a second password that is associated with a password keeper data store or application separate from the electronic messages, wherein the password keeper data store or application stores multiple different passwords, each password identified in the password keeper data store or application as associated with one or more secure electronic messages;
using the second password provided through the user prompt to access the first password identified as associated with the particular secure electronic message and that was used to encrypt the particular secure electronic message, the first password stored by the password keeper data store or application with the multiple different passwords, wherein using the second password provided through the user prompt to access the first password provides access to the first password;
using the first password accessed from the password keeper data store or application to decrypt corresponding electronic messages encrypted by the first password including the particular secure electronic message in order to perform a search of the particular secure electronic message's content; and
providing a result based upon the searching of the electronic messages;
wherein the input search is received from a user recipient of the electronic messages or from a computer application utilizing an application programming interface to provide the input search.

24. A non-transitory, computer-readable storage medium encoded with instructions that cause a mobile device to perform a method, said method for searching secure electronic messages on the mobile device that has a data processor, said method comprising:
receiving an input search;
searching through content of electronic messages using the input search;
wherein the searching includes searching through content of a particular secure electronic message using the input search;
wherein the secure electronic message is a message encrypted using a first password;

providing only once a user prompt for a second password that is associated with a password keeper data store or application separate from the electronic messages, wherein the password keeper data store or application stores multiple different passwords, each password identified in the password keeper data store or application as associated with one or more of the secure electronic messages;

using the second password provided through the user prompt to access the first password identified as associated with the particular secure electronic message and that was used to encrypt the particular secure electronic message, the first password stored by the password keeper data store or application with the other different passwords, wherein using the second password provided through the user prompt to access the first password provides access to the first password;

using the first password accessed from the password keeper data store or application to decrypt corresponding electronic messages encrypted by the first password including the particular secure electronic message in order to perform a search of the particular secure electronic message's content; and providing a result based upon the searching of the electronic messages;

wherein the input search is received from a user recipient of the electronic messages or from a computer application utilizing an application programming interface to provide the input search.

25. A system for searching secure electronic messages on a mobile device that has a data processor, comprising:

a search input mechanism configured to execute on the data processor and to receive an input search;

a secure message searcher configured to execute on the data processor and to search through content of electronic messages using the input search;

wherein the searching includes searching through content of a particular secure electronic message using the input search;

wherein the secure electronic message is a message encrypted using a first password; and means for providing only once a user prompt for a second password that is associated with a password keeper data store or application separate from the electronic messages, wherein the password keeper data store or application stores multiple different passwords, each password identified in the password keeper data store or application as associated with one or more of a plurality of secure electronic messages;

wherein the second password provided through the user prompt is used to access the first password identified as associated with the particular secure electronic message and that was used to encrypt the particular secure electronic message, the first password stored by the password keeper data store or application, wherein using the second password provided through the user prompt to access the first password provides access to the first password;

wherein the first password accessed from the password keeper data store or application is used to decrypt corresponding electronic messages encrypted by the first password including the particular secure electronic message in order to perform a search of the particular secure electronic message's content;

wherein a result is provided based upon the searching of the electronic messages;

wherein the input search is received from a user recipient of the electronic messages or from a computer application utilizing an application programming interface to provide the input search.

26. A method for searching secure electronic messages on a mobile device that has a data processor, comprising:

receiving an input search at the mobile device;

searching through content of electronic messages using the input search, the electronic messages stored at the mobile device;

wherein the searching includes searching through content of a particular secure electronic message using the input search;

wherein the particular secure electronic message is a message encrypted using a particular password, the particular password stored in a data store storing a plurality of different passwords at the mobile device, each password identified in the data store as associated with one or more of the secure electronic messages;

wherein an authorization is obtained to access the particular password from the data store for a period of time, wherein obtaining the authorization comprises:

providing only once a user prompt for a data store password associated with the data store; and using the data store password provided through the user prompt to access the particular password from the data store;

retrieving the particular password from the data store at the mobile device within the period of time;

using the particular password to decrypt corresponding secure electronic messages including the particular secure electronic message at the mobile device encrypted by the particular password in order to perform a search of the particular secure electronic message's content; and providing a result based upon the searching of the electronic messages;

wherein the input search is received from a user recipient of the electronic messages or from a computer application utilizing an application programming interface to provide the input search.

27. The method of claim 26, wherein the input search is a text string containing one or more key words for searching bodies of the electronic messages.

28. The method of claim 26, wherein the particular secure electronic message comprises a digitally signed message, said method further comprising the step of processing the digitally signed message; wherein the processing of the digitally signed message includes decoding the digitally signed message.

29. The method of claim 26, wherein the particular secure electronic message comprises a digitally signed message, wherein the digitally signed message is processed such that no or only one user prompt is generated that is required to search the signed message.

30. The method of claim 26, wherein the searching is performed upon a wireless mobile communications device that receives messages over a wireless communication network.

31. The method of claim 26, wherein the content includes textual content.

32. The method of claim 26, wherein the result includes a list of messages that satisfy the input search.

33. The method of claim 32, wherein the list of messages includes the particular secure electronic message.

34. A mobile device having a data processor for searching secure electronic messages, comprising:
a memory having instructions thereon;
the data processor coupled to the memory and configured by instructions to perform the operations of:
executing on the data processor and for receiving an input search at the mobile device;
searching through content of electronic messages using the input search, the electronic messages stored at the mobile device;
wherein the searching includes searching through content of a particular secure electronic message using the input search;
wherein the particular secure electronic message is a message encrypted using a particular password, the particular password stored in a data store storing a plurality of different passwords at the mobile device, each password identified in the data store as associated with one or more of the secure electronic messages;
wherein an authorization is obtained to access the particular password from the data store for a period of time, wherein obtaining the authorization comprises:
providing only once a user prompt for a data store password associated with the data store; and
using the data store password provided through the user prompt to access the particular password from the data store;
retrieving the particular password from the data store at the mobile device within the period of time;
using the particular password to decrypt corresponding secure electronic messages including the particular secure electronic message at the mobile device encrypted by the particular password in order to perform a search of the particular secure electronic message's content; and
providing a result based upon the searching of the electronic messages;
wherein the input search is received from a user recipient of the electronic messages or from a computer application utilizing an application programming interface to provide the input search.

35. A non-transitory, computer-readable storage medium encoded with instructions that cause a mobile device to perform a method, said method for searching secure electronic messages on the mobile device that has a data processor, said method comprising:
receiving an input search at the mobile device;
searching through content of electronic messages using the input search;
wherein the searching includes searching through content of a particular secure electronic message using the input search;
wherein the particular secure electronic message is a message encrypted using a particular password, the particular password stored in a data store at the mobile device storing a plurality of different passwords, each password identified in the data store as associated with one or more of the secure electronic messages;
wherein an authorization is obtained to access the particular password from the data store at the mobile device for a period of time, wherein obtaining the authorization comprises:
providing only once a user prompt for a data store password associated with the data store; and
using the data store password provided through the user prompt to access the particular password from the data store;
retrieving the particular password from the data store at the mobile device within the period of time;
using the particular password to decrypt corresponding secure electronic messages including the particular secure electronic message at the mobile device encrypted by the particular password in order to perform a search of the particular secure electronic message's content; and
providing a result based upon the searching of the electronic messages;
wherein the input search is received from a user recipient of the electronic messages or from a computer application utilizing an application programming interface to provide the input search.

36. A system for searching secure electronic messages on a mobile device that has a data processor, comprising:
a search input mechanism configured to execute on the data processor and to receive an input search at the mobile device;
a secure message searcher configured to execute on the data processor and to search through content of electronic messages using the input search, the electronic messages stored at the mobile device;
wherein the searching includes searching through content of a particular secure electronic message using the input search;
wherein the particular secure electronic message is a message encrypted using a particular password, the particular password stored in a data store storing a plurality of different passwords at the mobile device, each password identified in the data store as associated with one or more of the secure electronic messages; and
wherein an authorization is obtained to access the particular password from the data store for a period of time, wherein obtaining the authorization comprises:
providing only once a user prompt for a data store password associated with the data store; and
using the data store password provided through the user prompt to access the particular password from the data store;
wherein the secure message searcher is further configured to retrieve the particular password from the data store at the mobile device within the period of time;
wherein the particular password is used to decrypt corresponding secure electronic messages including the particular secure electronic message at the mobile device encrypted by the particular password in order to perform a search of the particular secure electronic message's content;
wherein a result is provided based upon the searching of the electronic messages;
wherein the input search is received from a user recipient of the electronic messages or from a computer application utilizing an application programming interface to provide the input search.

\* \* \* \* \*

UNITED STATES PATENT AND TRADEMARK OFFICE
CERTIFICATE OF CORRECTION

| | | |
|---|---|---|
| PATENT NO. | : 8,667,603 B2 | Page 1 of 1 |
| APPLICATION NO. | : 11/118792 | |
| DATED | : March 4, 2014 | |
| INVENTOR(S) | : Michael S. Brown et al. | |

It is certified that error appears in the above-identified patent and that said Letters Patent is hereby corrected as shown below:

In the Claims

In Column 13, In Line 8, In Claim 5, delete "the" and insert -- the digitally --, therefor.

In Column 16, In Line 14, In Claim 23, delete "haying" and insert -- having --, therefor.

In Column 19, In Line 3, In Claim 34, delete "haying" and insert -- having --, therefor.

Signed and Sealed this
Seventeenth Day of June, 2014

Michelle K. Lee
*Deputy Director of the United States Patent and Trademark Office*